(12) United States Patent
Garry et al.

(10) Patent No.: US 8,661,826 B2
(45) Date of Patent: Mar. 4, 2014

(54) COMBUSTION APPARATUS

(75) Inventors: Ian M Garry, Thurcaston (GB);
Michael N Wybro, Hucknall (GB)

(73) Assignee: Rolls-Royce PLC, London (GB)

( * ) Notice: Subject to any disclaimer, the term of this patent is extended or adjusted under 35 U.S.C. 154(b) by 1227 days.

(21) Appl. No.: 12/457,433

(22) Filed: Jun. 10, 2009

(65) Prior Publication Data
US 2010/0011775 A1 Jan. 21, 2010

(30) Foreign Application Priority Data

Jul. 17, 2008 (GB) .................................. 0813021.3
Jul. 17, 2008 (GB) .................................. 0813022.1

(51) Int. Cl.
*F02C 1/00* (2006.01)
*F02G 3/00* (2006.01)

(52) U.S. Cl.
USPC ................... 60/752; 60/753; 60/754; 60/755; 60/756; 60/757; 60/758; 60/759; 60/760

(58) Field of Classification Search
USPC .................................................. 60/752–760
See application file for complete search history.

(56) References Cited

U.S. PATENT DOCUMENTS

| | | | | |
|---|---|---|---|---|
| 4,655,044 A | * | 4/1987 | Dierberger et al. | ............. 60/753 |
| 5,902,647 A | * | 5/1999 | Venkataramani et al. | .... 427/454 |
| 6,408,628 B1 | * | 6/2002 | Pidcock et al. | ................. 60/752 |
| 6,620,457 B2 | * | 9/2003 | Farmer et al. | ................. 427/235 |
| 7,000,397 B2 | * | 2/2006 | Pidcock et al. | ................. 60/752 |
| 2008/0176000 A1 | | 7/2008 | Bohnheio et al. | |

FOREIGN PATENT DOCUMENTS

| | | |
|---|---|---|
| EP | 0 253 754 A1 | 1/1988 |
| EP | 0 916 445 A2 | 5/1999 |
| EP | 1 350 860 A1 | 10/2003 |
| WO | WO 99/23273 A1 | 5/1999 |

* cited by examiner

*Primary Examiner* — Phutthiwat Wongwian
*Assistant Examiner* — Craig Kim
(74) *Attorney, Agent, or Firm* — Oliff PLC (57) ABSTRACT

A coated turbine engine article having a first wall and a second wall, wherein the first wall has a shielding feature integral with the article and which inhibits entry of a coating material into an open passage extending between the first wall and the second wall when the coating material is directed towards the article using a line of sight process.

19 Claims, 6 Drawing Sheets

COMBUSTION APPARATUS

This invention relates to a method of coating a surface of an article having an aperture and apparatus assisting that method. The invention finds particular application for articles used in turbine engines, especially combustion apparatus and wall elements for a combustor.

A gas turbine engine combustor includes a generally annular chamber having a plurality of fuel injectors at an upstream head end. Combustion air is provided through the head and in addition through primary and intermediate mixing ports provided in the combustor walls, downstream of the fuel injectors.

In order to improve the thrust and fuel consumption of gas turbine engines, i.e. thermal efficiency, it is necessary to use high compressor pressures and combustion temperatures. Higher compressor temperatures give rise to higher compressor outlet temperatures and higher pressures in the combustor, which results in the combustor experiencing much higher temperatures than are present in most conventional prior combustor designs.

There is therefore a need to provide effective cooling of the walls defining the combustor. Various cooling methods have been proposed including the provision of a double walled combustion chamber whereby cooling air is directed into a gap between spaced outer and inner walls, thus cooling the inner wall. The cooling air is then exhausted into the combustion chamber through apertures in the inner wall. The inner wall may be provided by a series of closely located heat resistant tiles or by a unitary annular wall. The apertures which exhaust the cooling air to the combustion volume are typically angled along the direction of an axis of the combustor and may be angled circumferentially too such that the exhausted air can be supplied as a film of air that further serves to protect the combustor wall from the high temperature combustion products.

Often it is desirable to provide a low thermal conductivity thermal barrier coating on the hot side of the tiles that is usually deposited by spraying. The TBC may be applied before effusion holes are formed but this is often undesirable as the laser which typically forms the holes must necessarily cut through the coating. The TBC can have low adhesion to the metal wall and can be damaged or blown off when the laser cuts at the interface. In an alternative method the TBC is applied to the pre-drilled walls of the combustor. There is an alternative difficulty with this method in that the holes can become blocked by the TBC as it is deposited requiring a subsequent processing step to identify and clear the blocked holes.

It is an object of the present invention to seek to provide improved combustion apparatus and a method of manufacturing the improved combustion apparatus.

According to a first aspect of the invention there is provided a method of coating a turbine engine article having a passage, the method comprising the steps of providing the article with an open passage and a shielding feature that does not completely block the passage, directing coating material towards the article using a line of sight process such that the shielding feature inhibits entry of the coating material into the open passage.

Preferably the line of sight process is plasma spraying.

Preferably the article has a first surface and a second surface, wherein the passage extends between the first surface and the second surface and the first surface has the shielding feature integral with the article.

The shielding feature may be a projection having a face that extends away from the first wall, wherein the passage opens onto the face.

The opening of the passage is preferably at a height along the face of the projection that is greater than the thickness of the coating deposited onto the article.

The face may be set at an angle of 90° or less to the first wall.

Preferably the coating is deposited to a thickness in excess of 0.3 mm.

The coating may be a thermal barrier coating.

According to a second aspect of the invention there is provided a coated turbine engine article having a first surface and a second surface, wherein the first surface has a shielding feature integral with the article and which does not completely block an open passage and which inhibits entry of a coating material into the open passage extending between the first surface and the second surface when the coating material is directed towards the article using a line of sight process.

Preferably the shielding feature is a projection. The projection preferably has a face that extends away from the first surface and the passage opens onto the face.

It is desirable for the opening of the passage to be at a height along the face of the projection that is greater than the thickness of the coating on the article. The face is at an angle of 90° or less to the first wall. Preferably the coating has a thickness in excess of 0.3 mm.

The coating may be a thermal barrier coating. The article may be a combustor tile.

According to a third aspect of the invention there is provided a coated turbine engine article having a first wall and a second wall, wherein the first wall has a shielding feature integral with the article and which inhibits entry of a coating material into an open passage extending between the first wall and the second wall when the coating material is directed towards the article using a line of sight process wherein the shielding feature is a projection of pyramidical or conical form.

Preferably the tip of the pyramid or cone is attached to the article.

The projection may have a base spaced apart from the article, wherein the base presents an equal or greater area than the area of the open passage where it opens onto the first face when viewed in the intended direction of the coating material.

By open passage it is meant that the passage is not completely blocked by the shielding feature whilst the coating is being directed towards the article.

Embodiments of the invention will now be described by way of example only, with reference to the accompanying drawings, in which:

FIG. 1 depicts a ducted fan gas turbine engine generally indicated at 10 comprises, in axial flow series, an air intake 12, a propulsive fan 14, an intermediate pressure compressor 16, a high pressure compressor 18, combustion equipment 20, a high pressure turbine 22, an intermediate pressure turbine 24, a low pressure turbine 26 and an exhaust nozzle 28.

Figure 1:
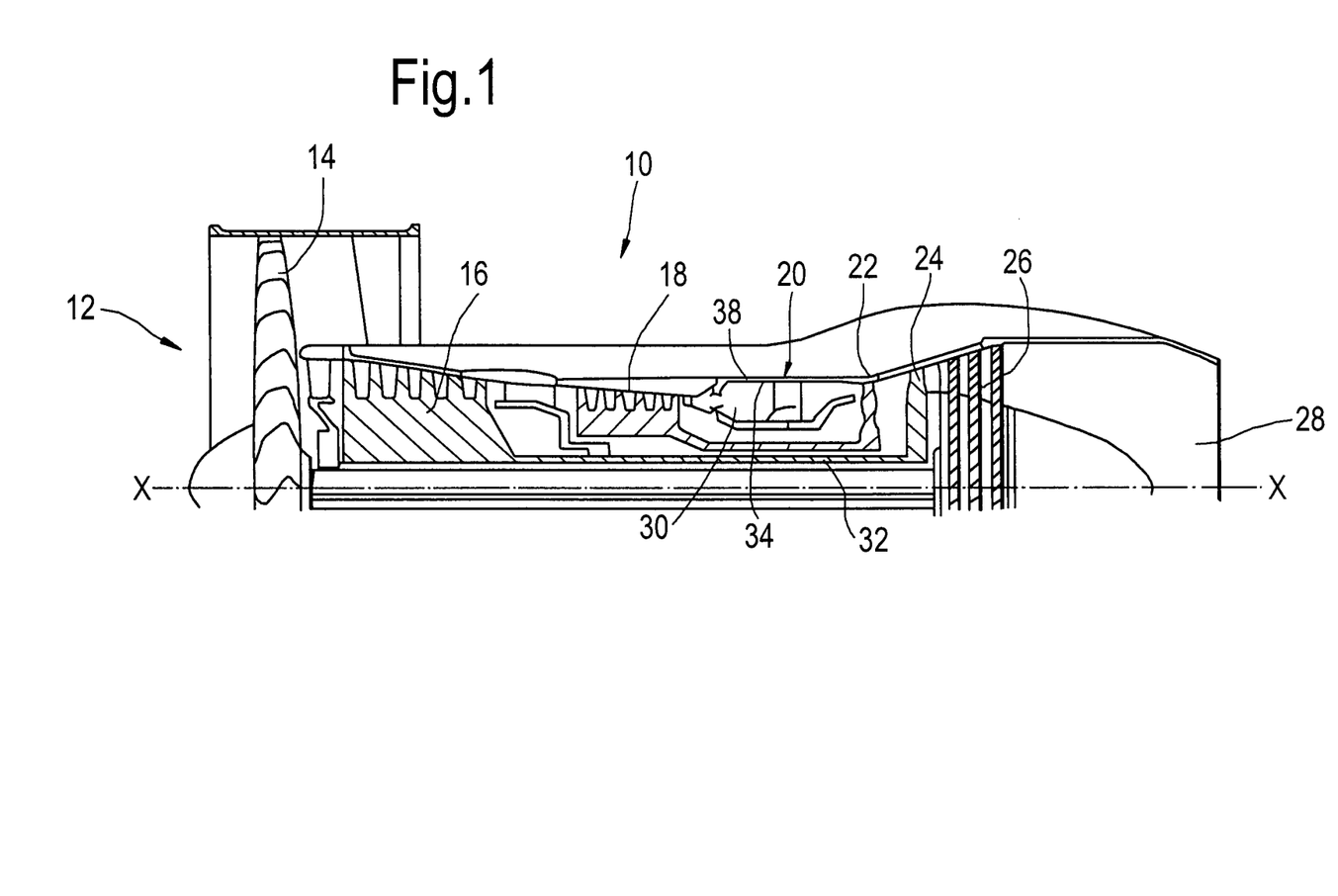
FIG. 1 depicts a ducted fan gas turbine engine.

The gas turbine engine works in the conventional manner so that air entering the intake 12 is accelerated by the fan 14 to produce two air flows, a first air flow into the intermediate pressure compressor 16 and a second airflow which provides propulsive thrust. The intermediate pressure compressor 16 compresses the air flow directed into it before delivering the air to the high pressure compressor 18 where further compression takes place.

The compressed air exhausted from the high pressure compressor 18 is directed into the combustion equipment 20 where it is mixed with fuel and the mixture combusted. The resultant hot combustion products then expand through and thereby drive the high, intermediate and low pressure turbines 22, 24, 26 before being exhausted through the nozzle 28 to provide additional propulsive thrust. The high, intermediate and low pressure turbines respectively drive the high and intermediate pressure compressors and the fan by suitable interconnecting shafts.

The combustion equipment comprises an annular combustor 30 having radially inner and outer wall structures 32 and 34 respectively. Fuel is directed into the combustor 30 through a number of fuel nozzles (not shown) located at the upstream end of the combustor. The fuel nozzles are circumferentially spaced around the engine 10 and serve to spray fuel into air derived from the high pressure compressor 18. The resultant fuel and air mixture is then combusted within the combustor.

The combustion process which takes place within the combustor naturally generates a large amount of heat. Temperatures within the combustor may be between 1850K and 2600K. It is necessary therefore to arrange that the inner and outer wall structures 32, 34 are capable of withstanding this heat whilst functioning in a normal manner. The radially outer wall structure can be seen in FIG. 2.

Figure 2:
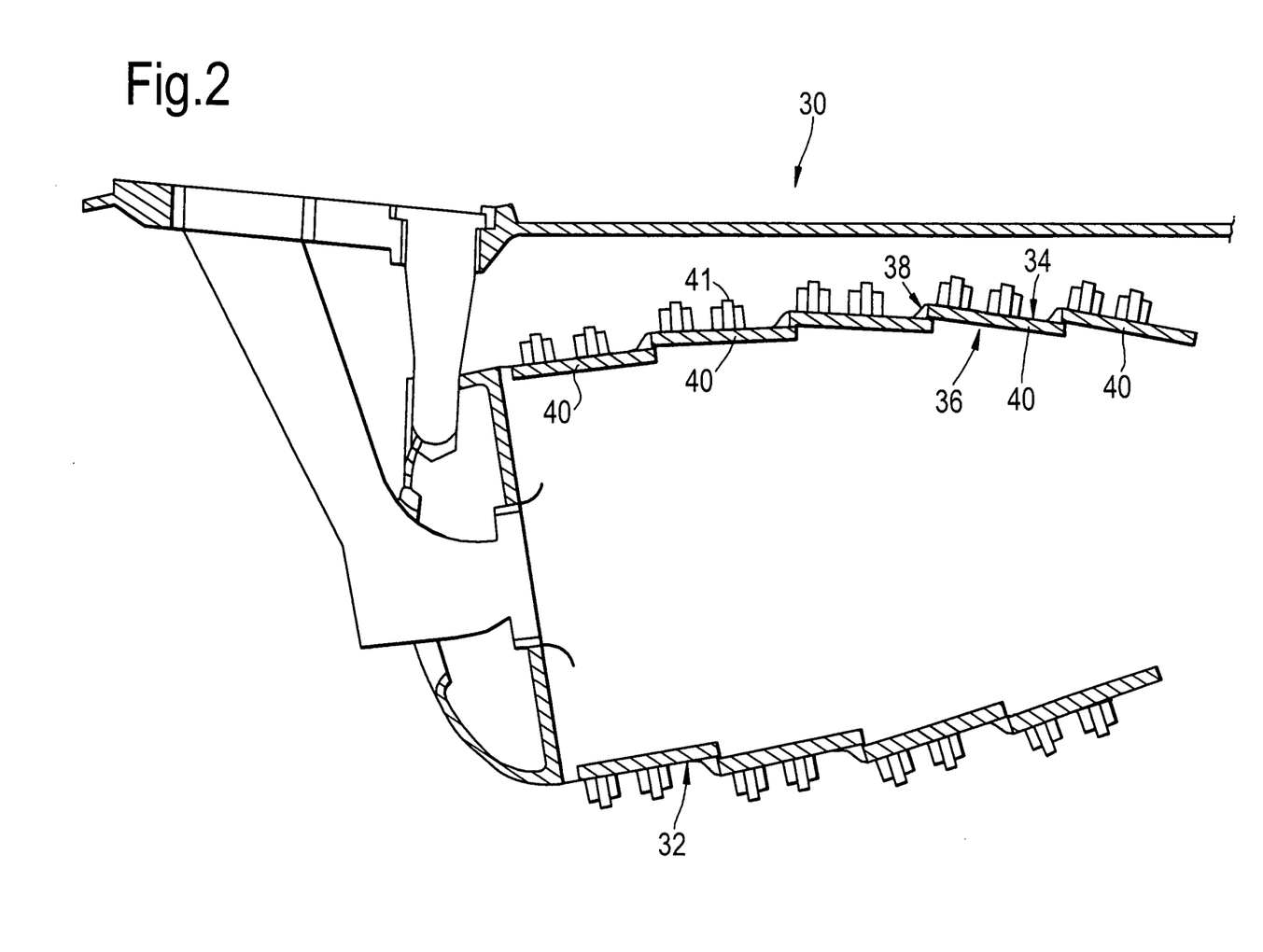
FIG. 2 is a diagrammatic cross-section through part of an annular combustor

Referring to FIG. 2 the wall structure 34 includes an inner wall 36 and an outer wall 38. The inner wall 36 comprises a plurality of discrete tiles 40 which are all of substantially the same rectangular configuration and are positioned adjacent each other. The majority of the tiles 40 are arranged to be equidistant from the outer wall 38. Each tile 40 is preferably formed by an additive manufacturing technique such as direct laser deposition, shaped metal deposition or powder bed processing. Additive manufacturing techniques build up the component as a series of layers. A laser or other heat source is arranged and operated to melt a wire or powder at selected locations. The melted material, when it cools and solidifies, forms a deposit with a height. Repeated deposition onto the deposit allows large and quite complex structures to be formed.

The tile is provided with integral studs 41 which facilitate its attachment to the outer wall 38. Feed holes (not shown in FIG. 2) are provided in the outer wall 38 such that cooling air is allowed to flow into the gap between the tiles 40 and the outer wall 38. The temperature of this air is around 800K to 900K and the pressure outside the combustor is about 3% to 5% higher than the pressure inside the combustor.

Figure 3:
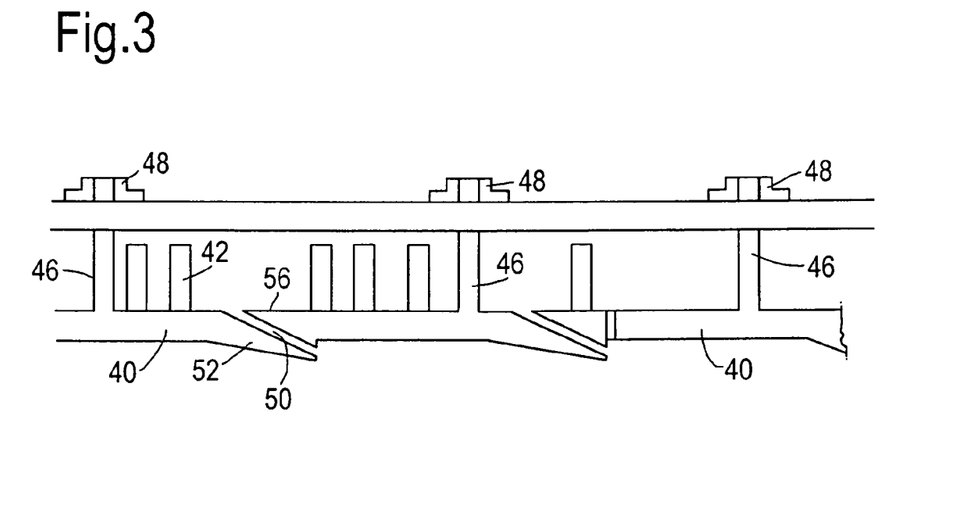
FIG. 3 depicts a wall element of the combustor

Referring to FIG. 3, each tile 40', 40" has a plurality of raised pedestals 42 (only pedestals on tile 40' are depicted) which improve the cooling process by providing additional surface area for the cooling air to flow over.

The effusion holes are also formed during the additive manufacturing process but further effusion holes may be formed by conventional laser drilling of the holes. Indeed, it can often be desirable to partially form some of the holes as the tile is manufactured but complete the holes by laser drilling.

Figure 4:
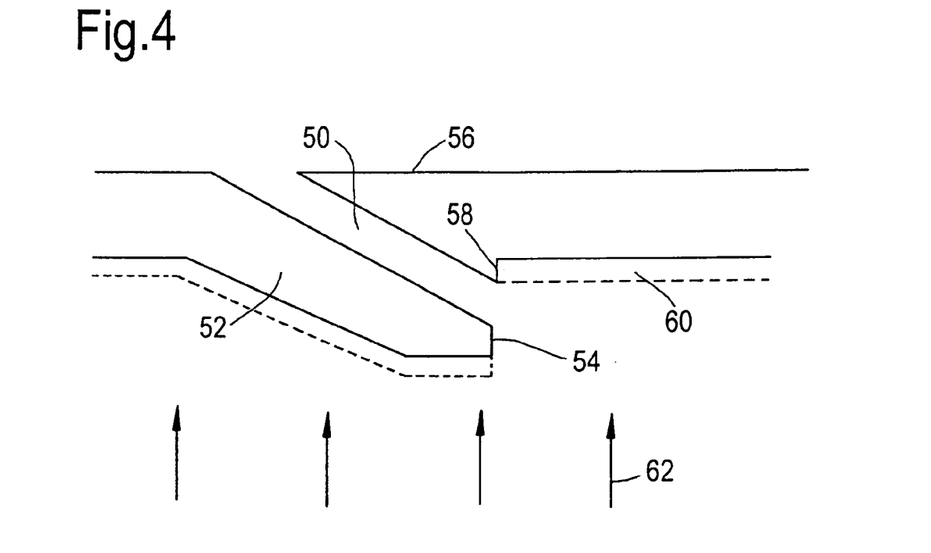
FIG. 4 is a portion of the wall element of FIG. 3 in greater detail

As shown in FIG. 3 and FIG. 4 which is an enlarged depiction of part of the tile in FIG. 3, the tile is cast to have localised projections 52 on the intended hot surface that extend out of the general plane of the tile. The projections have a sloped portion that leads via a face extending parallel to the plane of the tile hot surface to a bluff face 54 extending back to the general plane of the tile hot surface.

The effusion holes 50 lead from the cold surface 56 at an angle to the general plane of the tile to emerge on the bluff face 54 of the projection a short way from the plane of the hot surface. This leaves a length 58 of the bluff wall between the effusion hole outlet and the plane of the tile.

For this embodiment a projection is located upstream of a respective hole outlet with the projection having a semicircular or other aerodynamic upstream end and the downstream bluff wall. For alternative embodiments the projection may extend circumferentially as a band about the combustor.

The projections lift the hot film off the wall and direct it towards the mainstream flow through the combustor with a new cold film being formed from air 62 coming through the effusion holes.

Figure 6:
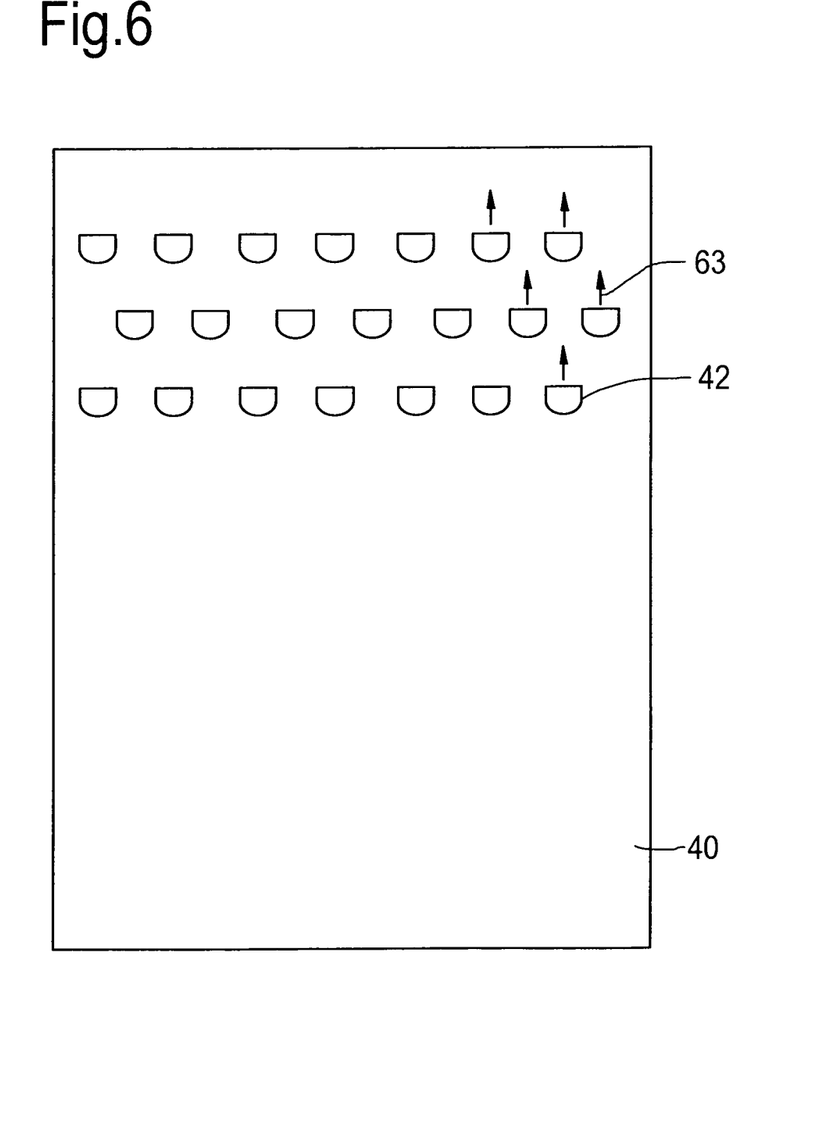
FIG. 6 depicts an alternative view of the wall element of FIG. 3 in the direction in which the coating media is applied.

A top view of a preferred tile is shown in FIG. 6. The effusion holes are arranged in axially spaced rows extending across the tile. The effusion holes are circumferentially offset from effusion holes in an adjacent row.

Thermal barrier coatings 60 are applied to the surface of the metal tile that is intended for use as the surface facing the combustion gasses. The coatings are typically deposited by plasma spraying onto a cleaned and roughened surface to which a bond coat is applied.

The bond coat is applied to a predetermined thickness using an alloy made up of cobalt, nickel, chromium, aluminium and yttria which provides a base for the thermal barrier coating and also acts as an oxidation and corrosion resistant barrier in its own right at elevated temperatures. The bond coat is applied by a method involving plasma spraying to a thickness of between 0.2 and 0.3 mm.

The bond coat provides a good surface for plasma spraying the TBC. An appropriate and preferred TBC comprises yttria stabilised zirconia. The spray is directed in the direction of arrows 62 to the tile at 90° to the plane of the tile to achieve a coating having a uniform thickness across the whole tile.

The shape of the projection 52 and the angle of the bluff surface 54 relative to the angle of the plasma spray depositing the TBC ensures that a uniform coating is deposited over the whole tile with the exception of the bluff face where little or no coating builds up. Although the bluff face is not significantly protected by TBC the life of the component is not affected as the face is adjacent a flow of cool air through the effusion passage 50.

The spacing 58 of the passage outlet from the plane of the tile allows a significantly thicker coating of TBC, up to 1.5 mm to be applied without blocking the apertures 50. This is up to four or more times that used on most conventional tile. It is desirable for the passage to outlet to emerge at a height 58 equivalent to the specified coating thickness so that there is a smooth flow of cooling air over the TBC coating without generating eddies that can introduce turbulence into the cooling effusion flow.

Figure 5:
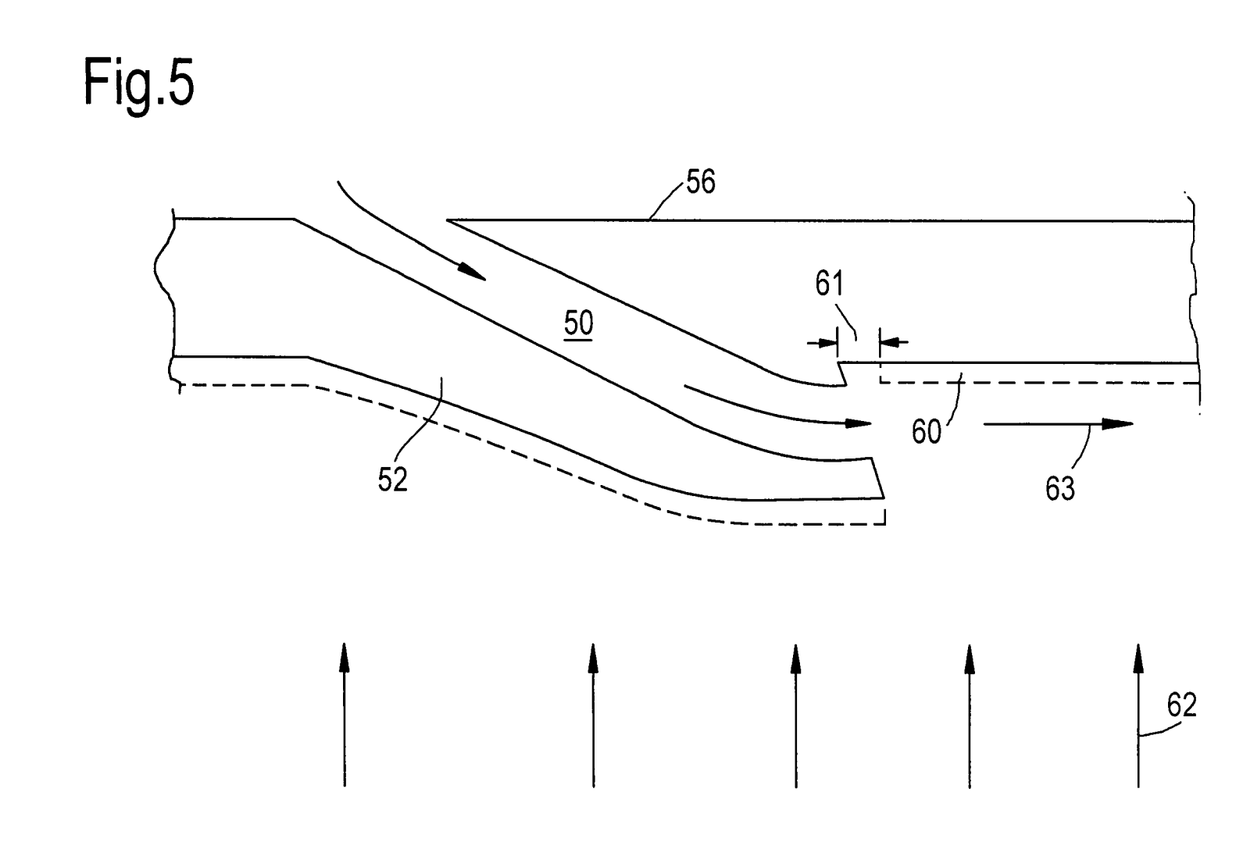
FIG. 5 depicts an alternative embodiment to the wall element portion of FIG. 4.

In further embodiments, depicted for example in FIG. 5, the bluff face is replaced with an overhang which further reduces the risk of the TBC blocking the cooling aperture. In this embodiment the projection has a cooling passage 50 having a curved profile which improves the pressure profile of the cooling flow enabling an improved effusion cooling film. Alternatively the cooling passage 50 may be drilled by a laser using a known process or etched.

FIG. 6 depicts a view of tile 40 looking at the hot surface in the direction in which the coating is applied. The projections 52 are arranged in rows of discrete pimples rather than as a continuous band, which is an alternative option. Air flow 62 enters the combustor from the downstream edge of each of these projections and each projection is offset from the projections of a neighbouring row by half the pitch between the projections in the row.

Figure 7:
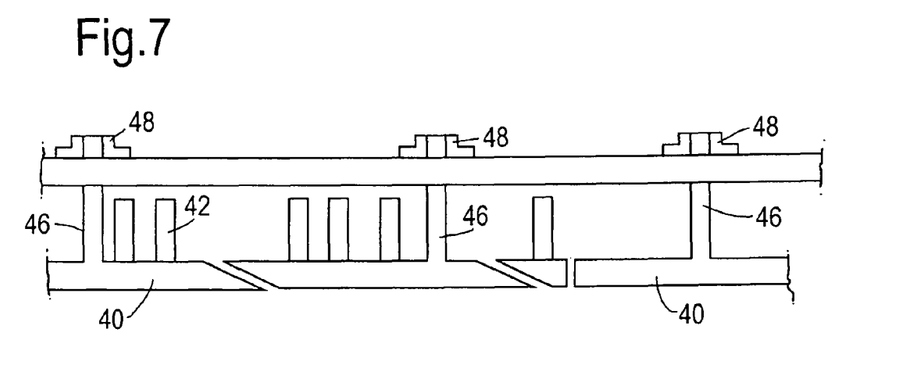
FIG. 7 depicts a wall element of the combustor in accordance with a second embodiment of the invention
Figure 8:
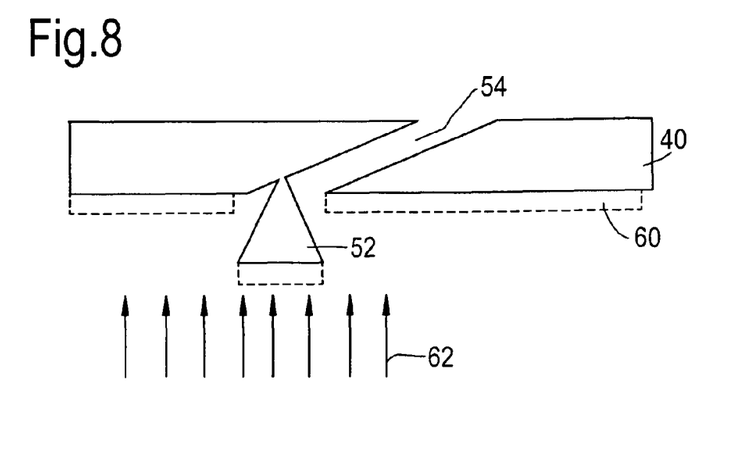
FIG. 8 is a portion of the wall element of FIG. 7 in greater detail

In an alternative embodiment described with reference to FIGS. 7 and 8 where FIG. 8 is an enlarged depiction of part of the tile in FIG. 7, the tile is provided with localised projections 52 on the intended hot surface. The projections are preferably formed during the additive manufacturing process.

To form the tile and projections by a powder bed process a layer of powder is provided as a bed. The bed is located on a support that can index downwards. A laser is arranged to traverse over the powder and selectively melt regions of the powder. As the laser traverses away from each melted region the melted powder solidifies. After a layer has been completed the support indexes downwards and new supply of powder is added onto the bed, levelled and the laser re-traversed over the powder. Where the laser beam is applied to the powder overlying a previously melted layer the underlying layer is partially re-melted along with the overlying powder. When the melted area cools the layers are joined. By careful selection of the locations to which the laser is applied it is possible, by forming multiple layers, to build up both the tile and a conical or pyramidical projection 52 which has a final cross section of equal or greater cross section than that of the aperture 54 where it opens to the intended hot wall of the tile 40.

If the projection is formed by another additive manufacturing process e.g. direct laser deposition the powder bed is dispensed with and instead the laser is directed straight onto the wall of the passage 54 to melt a portion thereof and a metal powder is dispensed into the melt pool where it is melted. The dispensed metal powder cools to form a projection. Repeated application of the laser and powder to the projection permits a conical or pyramidical form to be generated.

The conical or pyramidical projection is beneficial as passage 54 remains open permitting the removal of the powder, or the supply of a media such as air or another gas when a thermal barrier coating 60 is applied to the intended hot surface of the tile. The relatively small point of connection where the projection meets with the tile wall 40 also offers a frangible location permitting simple removal of the projection once the thermal, or other barrier coating 60 has been applied.

Thermal barrier coatings 60 are applied to the surface of the metal tile that is intended for use as the surface facing the combustion gasses. The coatings are typically deposited by plasma spraying onto a cleaned and roughened surface to which a bond coat is applied.

The bond coat is applied to a predetermined thickness using an alloy made up of cobalt, nickel, chromium, aluminium and yttria which provides a base for the thermal barrier coating and also acts as an oxidation and corrosion resistant barrier in its own right at elevated temperatures. The bond coat is applied by a method involving plasma spraying to a thickness of between 0.2 and 0.3 mm.

The bond coat provides a good surface for plasma spraying the TBC. An appropriate and preferred TBC comprises yttria stabilised zirconia. The spray is directed in the direction of arrows 62 to the tile at 90° to the plane of the tile to achieve a coating having a uniform thickness across the whole tile.

The shape of the projection 52 ensures that a uniform coating is deposited over the whole tile with the exception of the shaded area corresponding to the aperture 54 opening.

The shading of the passage 54 outlet allows a significantly thicker coating of TBC of up to 1.5 mm to be applied, up to four or more times that used on most conventional tile, without blocking the apertures.

Although the above embodiments have been described with respect to the hot surface lying in a plane the tiles for which the invention finds application may also be curved so that they can be arranged to define the inner wall of the combustor which may be annular or can-annular or have any other appropriate form. Indeed, although the application has been primarily directed to combustors the invention may be used in other components of a gas turbine as appropriate for example blades, stators, etc. The invention may also find application in industries other than gas turbine industries where it is desirable to coat a component with a coating and avoid blocking apertures extending through the component. The coatings may not be thermal barrier coatings but may offer advantageous protection from other potentially damaging environments.

The article may also be formed by casting rather than by using an additive manufacturing technique and may include an integrally cast stud 46 which is threaded at its distal end and may be used to secure the tile to the outer wall by means of a nut 48.

The invention claimed is:

1. A method of coating a turbine engine article having a passage, the method comprising the steps of:
   providing the article with an open passage that extends between a first surface on the article and a second surface of the article and a shielding feature that does not completely block the passage; and
   directing coating material towards the article using a line of sight process such that the shielding feature inhibits entry of the coating material into the open passage, wherein
   the shielding feature is a projection having a face that extends away from the first surface,
   the passage opens onto the face, and
   all portions of an opening of the passage are spaced from the first surface by at least a height that is greater than a thickness of the coating material deposited onto the first surface.

2. A method according to claim 1, wherein the line of sight process is plasma spraying.

3. A method according to claim 1, wherein the shielding feature is integral with the article.

4. A method according to claim 1, wherein the face is at an angle of 90° or less to the first surface.

5. A method according to claim 1, wherein the coating is deposited to a thickness in excess of 0.3 mm.

6. A method according to claim 1, wherein the coating is a thermal barrier coating.

7. A coated turbine engine article comprising:
   a first surface;
   a second surface; and
   an open passage extending between the first and second surfaces,
   wherein the first surface has a shielding feature that projects from the first surface and has a face onto which the passage opens,
   wherein the shielding feature is integral with the article and does not completely block an open passage and which inhibits entry of a coating material into the open passage extending between the first surface and the second surface when the coating material is directed towards the article using a line of sight process, and wherein all portions of an opening of the passage are spaced from the first surface by at least a height that is greater than a thickness of the coating material deposited onto the first surface.

8. A coated article according to claim 7, wherein the face is at an angle of 90° or less to the first surface.

9. A coated article according to claim 7, wherein the coating has a thickness in excess of 0.3 mm.

10. A coated article according to claim 7, wherein the coating is a thermal barrier coating.

11. A coated article according to claim 7, wherein the article is a combustor tile.

12. A coated turbine engine article comprising:
a first surface; and
a second surface,
wherein the first surface has a shielding feature integral with the article and which inhibits entry of a coating material into an open passage extending between the first surface and the second surface when the coating material is directed towards the article using a line of sight process, and
wherein the shielding feature is a projection of pyramidical or conical form.

13. A coated article according to claim 12, wherein the tip of the pyramid or cone is attached to the article.

14. A coated article according to claim 12, wherein the projection has a base spaced apart from the article, wherein the base presents an equal or greater area than the area of the open passage where it opens onto the first face when viewed in the intended direction of the coating material.

15. A coated article according to claim 12, wherein the coating has a thickness in excess of 0.3 µm.

16. A coated article according to claim 12, wherein the coating is a thermal barrier coating.

17. A coated article according to claim 12, wherein the article is a combustor tile.

18. A coated article according to claim 13, wherein the pyramid or cone has an axis that extends orthogonally from the first surface.

19. A coated turbine engine article comprising:
a hot side surface;
a cold side surface; and
an open passage extending between the hot side and the cold side surfaces,
wherein the hot side surface has a shielding feature that projects from the hot side surface and has a face onto which the passage opens, an opening for the passage on the cold side surface being further upstream than the opening for the passage on the face;
wherein the shielding feature is integral with the article and does not completely block the open passage and which inhibits entry of a coating material into the open passage extending between the hot side surface and the cold side surface when the coating material is directed towards the article using a line of sight process; and
wherein the opening for the passage on the face is spaced from the hot side surface by a height that is greater than the thickness of the coating material deposited onto the hot side surface.

* * * * *

UNITED STATES PATENT AND TRADEMARK OFFICE
CERTIFICATE OF CORRECTION

| | | |
|---|---|---|
| PATENT NO. | : 8,661,826 B2 | |
| APPLICATION NO. | : 12/457433 | |
| DATED | : March 4, 2014 | |
| INVENTOR(S) | : Garry et al. | |

It is certified that error appears in the above-identified patent and that said Letters Patent is hereby corrected as shown below:

On the Title Page, Item [75]: second inventor's name should be Michael N Wybrow

Signed and Sealed this
Twenty-seventh Day of May, 2014

Michelle K. Lee
*Deputy Director of the United States Patent and Trademark Office*